United States Patent [19]
Bolas et al.

[11] Patent Number: 5,513,129
[45] Date of Patent: Apr. 30, 1996

[54] METHOD AND SYSTEM FOR CONTROLLING COMPUTER-GENERATED VIRTUAL ENVIRONMENT IN RESPONSE TO AUDIO SIGNALS

[75] Inventors: Mark Bolas; Ian E. McDowall, both of Palo Alto; Michael N. Bolas, Los Angeles, all of Calif.

[73] Assignee: Fakespace, Inc., Menlo Park, Calif.

[21] Appl. No.: 91,650

[22] Filed: Jul. 14, 1993

[51] Int. Cl.[6] .................................................. G06F 17/00
[52] U.S. Cl. ........................................................ 364/578
[58] Field of Search ................................ 364/578, 514, 364/DIG. 1, DIG. 2; 360/14.2; 340/712; 358/81, 82; 345/156; 84/645, 610, 464 R, 601, 602, 609, 611, 634, 635, 641, 642, DIG. 1, DIG. 2, DIG. 29; 395/152, 153, 154, 155, 156, 157, 159, 161, 200

[56] References Cited

U.S. PATENT DOCUMENTS

| | | | |
|---|---|---|---|
| 3,490,328 | 1/1970 | King | 84/464 |
| 3,609,019 | 9/1971 | Tuber | 369/13.5 |
| 3,617,647 | 11/1971 | Maier et al. | 369/13.5 |
| 3,900,886 | 8/1975 | Coyle | 358/82 |
| 4,081,829 | 3/1978 | Brown | 358/82 |
| 4,182,214 | 1/1980 | Wakeman | 84/DIG. 29 |
| 4,257,062 | 3/1981 | Meredith | 358/81 |
| 4,267,561 | 5/1981 | Karpinsky | 358/82 |
| 4,768,086 | 8/1988 | Paist | 358/81 |
| 4,988,981 | 1/1991 | Zimmerman et al. | 340/709 |
| 5,148,154 | 9/1992 | MacKay et al. | 395/155 |
| 5,307,456 | 4/1994 | MacKay | 395/154 |
| 5,319,452 | 6/1994 | Funahashi | 84/464 R |

FOREIGN PATENT DOCUMENTS

| | | | |
|---|---|---|---|
| 2142461 | 1/1985 | United Kingdom | 84/610 |
| WO92/09948 | 6/1992 | WIPO | G06F 3/03 |

OTHER PUBLICATIONS

Jacobson, et al., "Time for Technojuju," *NewMedia*, p. 18, Jan. 1993.

*Primary Examiner*—Ellis B. Ramirez
*Attorney, Agent, or Firm*—Limbach & Limbach; Alfred A. Equitz

[57] ABSTRACT

A method and apparatus for the control and manipulation of a virtual environment (such as virtual objects therein) in response to a music signal. The music is either interpreted directly to effect the control and manipulation. Alternatively, a control track corresponding to an audio signal (such as a music signal) is prerecorded, played back with the audio signal, and the control track is processed to control and manipulate the virtual world (or to control some other process of a computer system) as the audio signal is playing. In preferred embodiments, a computer creating a virtual world interprets the music, the control track, or both, and uses the resulting information to modify, create, and or control objects in the virtual environment. Preferred embodiments of the inventive system include apparatus for delaying input music to compensate for lag introduced by the system components, such as delay required to implement processing of control tracks corresponding to the input music.

23 Claims, 7 Drawing Sheets

METHOD AND SYSTEM FOR CONTROLLING COMPUTER-GENERATED VIRTUAL ENVIRONMENT IN RESPONSE TO AUDIO SIGNALS

Field of the Invention

The invention pertains to methods and apparatus for controlling a computer system in response to music signals, or in response to prerecorded control tracks corresponding to audio signals (such as music signals). In preferred embodiments, invention pertains to methods and apparatus for creating and modifying, or otherwise controlling, computer-generated virtual environments (or displayed virtual objects in virtual environments) in response to music signals or in response to prerecorded control tracks corresponding to audio signals.

BACKGROUND OF THE INVENTION

The terms "virtual environment," "virtual world," and "virtual reality" are used interchangeably to describe a computer-simulated environment (intended to be immersive) which includes a graphic display (from a user's first person perspective, in a form intended to be immersive to the user), and optionally also sounds which simulate environmental sounds. The abbreviation "VR" will sometimes be used herein to denote "virtual reality," "virtual environment," or "virtual world". A computer system programmed with software, and including peripheral devices, for producing a virtual environment will sometimes be referred to herein as a VR system or VR processor.

The graphic display generated by a VR system can be a two-dimensional (2D) or a three-dimensional (3D) display. Typically, a VR system includes an input device and user interface software which enable a user to interact with the scene being displayed, typically to simulate motion in the virtual environment or manipulation of displayed representations of objects ("virtual objects") in the virtual environment. Typically, the illusion of immersion in a virtual reality system is strengthened by the use of head-tracking or some other such system which directs the computer to generate images along the area of viewing interest of the user.

The present invention is a method and apparatus particularly useful for creating and/or controlling virtual environments. A VR system which embodies the invention can rapidly and inexpensively create, animate, or otherwise control a wide variety of entertaining virtual environments and virtual objects in response to music or in response to prerecorded "control tracks" which correspond to audio signals (such as music).

While currently being used in the research and scientific communities, VR systems are becoming less expensive and are poised to reach the consumer electronics market as entertainment devices.

VR systems must generate a much greater amount of content data (image data and audio data simulating environmental appearance and sounds) than must be generated in most other electronic media. Whereas video game systems require complex scenes to be generated and themes to be programmed, such systems can easily limit the scope of the game content because they can easily constrain the player to move in a few simple directions (e.g., left and right) and need only produce images to be presented on flat screen monitors or on simple 3D field-sequential type monitors.

In contrast, by their very nature, VR systems allow the user to look around and fly around in many different directions and positions. Even where the user is constrained to look only toward the left or the right, VR systems must construct complete representations of 3D worlds. This complexity has made it very difficult to generate virtual worlds for the consumer entertainment market in a quick fashion.

In addition to the complexity of creating static 3D models for virtual worlds, it has also been difficult to control the dynamics of virtual worlds. VR systems to date are notorious for providing only very boring and nearly static environments. The few VR systems that include dynamic motions of the virtual world either base such motions on physical laws (such as gravity) or base the motions on corresponding motions produced by human users (such as motion of the fingers of a user wearing a conventional "glove" input device).

The present invention overcomes the limitations of conventional VR systems by providing an efficient way to generate content data (i.e., animated image data and audio data) to fill or populate a virtual environment in a choreographed response to input music signals.

There has long been an interest in the virtual reality field with respect to the possibility of virtual musical instruments and the creation of new and novel instruments within a virtual world. The present invention is a radical shift from previous attempts to combine music and virtual environments.

Conventional efforts to integrate music with virtual environments have, to date, all been directed toward creation of music from a virtual environment. The musical expression of the user has been treated as an urge seeking to be brought forth, and virtual environments have been seen as vehicles for the user to perform music or dance without having to learn special physical skills. Much effort has been made to make sounds appear to be coming from virtual objects in the virtual environment. This has been done by running audio into the VR system and then convolving the audio in such a way as to make it appear to come from a certain place in the virtual environment.

For example, at the NASA Ames View Lab, Scott Fisher, Rick Jacoby, and others explored virtual environments. One aspect of the research was the integration of audio into the virtual experience. This included the use of audio cues for such purposes as telling one if one bumped into a virtual object, but there was no tactile feedback for such events. The research pushed into the more artistic realm of creation of music in the context of a virtual world.

Mark Bolas and Phil Stone created the Virtual Theremin and virtual drum kit. In this system, the user wore a glove and a hand tracker and moved the gloved hand to manipulate virtual objects which were in turn linked to various synthesizer parameters. Thus, by manipulating virtual objects (as taught, for example, by U.S. Pat. 4,988,981, issued Jan. 29, 1991), sounds of different qualities could be created. A skilled user could create modern sounding musical interludes. These ideas have been carried forth by people such as Jaron Lanier who has given a number of public performances in which he manipulates virtual objects to create a musical performance. Research and exploration along these lines is expected to continue (the virtual "air guitar" and the like will probably be developed). In all VR systems of this type, manipulation of a virtual object causes the sound or music to change.

Currently, virtual worlds are created by describing a simulation and a number of objects. The interaction of the objects is described in some form of simulation language or graphical description. Traditionally, the control and creation of the objects is driven by "world building" software. Once a virtual world has been created, a limited number of its parameters may be manipulated by the user from "inside" the virtual world. One example of how these databases are created is described in PCT International Patent Application WO 92/09948, by VPL Research Inc. As is evident from WO 92/09948, it has define animation for all or even some of the virtual objects in a virtual world. Until the present invention, it had not been proposed to interface to nodes in a database defining a virtual environment, and to manipulate such nodes, on the basis of music.

Conventional VR systems and music have thusfar been used together in ways which have the following disadvantages:

(a) a VR system has been used as a virtual musical instrument, so that the user must "play" the virtual instrument (by manipulating an input device) to hear anything. This means that the system creates music, and that the system's musical output is limited by the user's ability to "play" the "instrument;"

(b) VR systems that have given sounds to virtual objects (e.g., the system displays a virtual kitchen sink and produces a "drip-drip" sound which seems to come from the sink's location) have required that the sounds are generated by signals produced within the VR system in response to user manipulation of an input device or internal programs, which signals are then interpreted by a synthesizer. The sounds produced by the synthesizer are thus cued from the VR system in response to manipulation of an input device (which manipulation may, for example, to cause a user to "move" into a position to view or otherwise interact with a virtual kitchen sink from which sounds will then seem to emanate). Thus, these VR systems have depended on user manipulation of an input device to control the appearance or activities of objects in a virtual environment, to cause the VR system to cue production of sound events; and (c) VR systems have played musical scores as background music for the virtual environment.

Basically, the paradigm to date has been to create systems that have (virtual) object-driven sounds. This invention reverses the paradigm to create a system which has musically-driven objects.

One VR system has been developed in which a VR processor is programmed to perform simple operations to modify a virtual environment in response to voice commands. This VR system, developed at the NASA Ames View Lab during the years 1988–1989, was capable of displaying a virtual object, or terminating the display of a virtual object, in response to a voice command from a human user. However, the system did not produce, modify, or otherwise control a virtual environment in response to music, or in response to a prerecorded control track corresponding to an audio signal.

Outside the VR field, many attempts have been made to produce devices which provide users with visual light effects based on an audio signal, such as music. However, these systems have been disappointing to watch (principally because the light shows are two-dimensional and are not obviously correlated with the audio input), and have typically met with disappointment when marketed.

An example of a conventional apparatus for producing visual light effects based on audio signals is described in U.S. Pat. No. 4,081,829 (issued Mar. 28, 1978). This apparatus controls the display of two-dimensional rings or solid shapes on the screen of a television receiver, in response to audio input signals. However, only a limited set of two-dimensional shapes can be displayed and only limited changes in their shape or color can be accomplished in response to the audio input.

Another example of a conventional apparatus for producing visual light effects in response to audio signals is described in U.S. Pat. No. 4,257,062 (issued Mar. 17, 1981). This apparatus controls a set of lamps which are mounted in eyewear to be worn by the user, by switching individual ones of the lamps on and off in response to music. Peak levels of specific frequency bands of the music are detected and employed to switch on or off different ones of the lamps.

Another system for producing visual effects in response to audio signals has been described in the Jan. 1993 issue of NewMedia magazine (at page 18) as a system which includes a Silicon Graphics Iris Indigo workstation, and which alters the appearance of colored visual representations of sound waves (displayed on a large screen in a concert hall) in response to crowd noise (picked up by a microphone during a concert) and live music in MIDI format (generated by musicians during the concert) supplied to the workstation.

It is believed that prerecorded control tracks (which correspond to prerecorded audio such as music) have not been employed to control operation of a computer system, such as to control generation of a virtual environment by a VR computer system. It is also believed that control signals have not been extracted from music for use in controlling generation of a virtual environment by a VR system (e.g., by populating the virtual environment with animated virtual objects which move in response to the music).

SUMMARY OF THE INVENTION

In a preferred embodiment, the invention is a computer system and computer-implemented method for the creation and control of a virtual world in response to music signals and/or prerecorded control tracks corresponding to the music signals. The system includes means for interfacing between the computer software which controls production of the virtual world, and live or prerecorded music (and/or prerecorded control tracks). The invention transcends traditional use of VR as a musical instrument, and enables a VR system to be employed as a virtual stage driven by music.

In another class of embodiments, the invention controls operation of a computer system (which need not be a VR system) in response to one or more prerecorded control tracks corresponding to audio signals, or in response to both music signals and one or more such prerecorded control tracks.

The component of the inventive system which generates control signals from input music (and/or prerecorded control tracks and/or human generated input signals), or which sends prerecorded control tracks in appropriate format to a VR system or other processor, will sometimes be referred to herein as an "Acoustic Etch" system or an "Acoustic Etch."

In preferred embodiments, the invention employs music to manipulate or control a virtual environment. This can be accomplished in several ways. Since music cannot directly interact with the virtual environment, the Acoustic Etch receives music (in some electronic, acoustic, or optical form) and generates control signals therefrom which are used by a VR system to influence activity in the virtual world.

The control signals derived from the music may be extracted from the music directly. For example, the Acoustic Etch can employ a simple algorithm (of the same type used by well known graphic equalizers) to extract a rhythm signal indicative of the beat of some frequency band of the music (e.g. a band representing drums), or of some other parameter of a frequency band of the music. The rhythm signal is sent to the VR system which in turn generates control signals therefrom to control the rhythm of a virtual dancer (or some other moving virtual object).

As an alternative (or in addition) to extracting signals from music itself for processing by a VR system, the invention can supply to the VR system one or more prerecorded control tracks corresponding to the music, or can generate control signals from prerecorded control tracks and then supply such control signals to the VR system for processing. For example, control tracks can be prerecorded along with left and right tracks of a stereo music signal. The prerecorded control tracks, left stereo track, and right stereo track, can then be played back (simultaneously or with selected delays between them) and received in parallel by the VR system. The control tracks can be generated automatically (e.g., by electronic signal processing circuitry) in response to a music signal and then recorded, or can be generated in response to manually asserted commands from a person (while the person listens to such music signal) and then recorded.

Prerecorded control tracks can be indicative of more sophisticated analysis of a corresponding music signal than could be conveniently performed by some contemplated (e.g., inexpensive) VR system embodiments of the invention. The placement and rhythm of dancers could be encoded in prerecorded control tracks, for example.

The use of prerecorded control tracks has several advantages and features, including the following:

(a) an entire song can be choreographed and prerecorded with a control track (for example, indicative of placement and rhythm of dancers), so that the control track forms part of the prerecorded choreographed musical work;

(b) the control track can include higher level information, such as pictures of a dancer or other performer, which can be used as source data by the VR system to display images of the performer in the virtual environment;

(c) the medium for the control track need not the same as that of the music. For example, the music may be recorded on a compact disk (CD) while the control track is recorded on a computer game cartridge or other medium;

(d) synchronization of the control track and the music can be accomplished under control of the VR system, which could use the control track to synchronize with the music, or vice versa;

(e) the control track can be encoded (or processed) in a way which accounts for the "delay time" required for the VR system to use the information coming from the control track. This will improve the apparent synchronization between the music and the graphics data output from the VR system, even when the VR system requires a long time to "draw" a particular frame of an animated virtual world; and (f) a prerecorded control track can eliminate the need for some embodiments of the invention to include means for automatically decoding musical expression (the automatic decoding of musical expression is poorly understood).

For example, an operator can record a control track which is emotionally linked with a song. The VR system could then easily convert the control track into a variety of control signals, and can produce more repeatable and interesting results than could be achieved by processing the music directly (in the absence of the control track).

The major disadvantage of using a prerecorded control track is that the control track must be generated and recorded in advance, and then played back in some way. It must be delivered in conjunction with the music, and the easiest way to do this is on the same physical recording medium.

An advantage of embodiments of the invention which directly process music (rather than processing a prerecorded control track) is that the music and the VR control signals generated therefrom are more independent than are a control track and the VR control signals generated therefrom (and can be related in any of a variety of ways). In embodiments which directly process music, the visual experience and emotional coupling between the VR and the music is looser, since the interpretation is generically related to musical signals and their processing. However, specific processing algorithms can be used by the VR system for specific songs-thus tailoring the algorithm to the music.

In essence, preferred embodiments of the invention use music to create a "track" of distilled music which is in a form usable by a VR system. The interpretation of the information is still dependent on the VR system, or the particular VR software being run by a computer system. The same "raw" music or control track can be interpreted differently by different VR systems (or VR software programs) in the sense that different VR systems (or programs) can generate different sets of control signals in response to a single raw input signal. Alternatively, the same VR system (or program) can interpret the same "raw" music or control track differently at different times. The control track can be used to program the VR system's response and thus tailor the system to a specific song.

OBJECTS AND ADVANTAGES

Accordingly, several objects and advantages of various embodiments of the present invention are:

to provide an apparatus which extracts information from music (or other audio) for the control and manipulation of objects within a virtual environment;

to provide an apparatus which uses a control track prerecorded along with audio (music, in preferred embodiments) for the control and manipulation of objects within a virtual environment;

to provide a VR system which delays audio (in response to which control signals are generated) in order to compensate for the lag introduced by other components of the VR system;

to provide a virtual experience in which music effectively drives the display of an animated graphical scene;

to provide a mechanism by which music is used to control and influence a virtual environment in such a way as to relieve the database which describes the virtual environment from having to define all the motions of the objects in the virtual environment;

to provide a control track for the influence and control of a virtual environment in which the control track is created during or following the music recording and production process when individual tracks (of a multi-track musical work) that are used for a particular mix are available before being mixed down; and to provide a control track which can contain information (such as images of a performer's face, for example) other than information extracted from corresponding music;

Further objects and advantages are to provide for the rapid creation and animation of a virtual environment from music which already has a high level of production quality.

DETAILED DESCRIPTION OF THE PREFERRED EMBODIMENTS

The term "audio signal" is used herein in a broad sense to include not only sound waves but also electrical, optical, or other signals representing sound waves (such as the electrical output of a transducer in response to sound waves). The terms "music signal" and "music" are used interchangeably herein in a broad sense to include not only sound waves that are recognizable by a human listener as music, but also electrical, optical, or other signals representing such sound waves (such as the electrical output of a transducer in response to the sound waves). Typically, a system embodying the invention will receive and process music signals in the form of digitized electrical signals.

Figure 1:
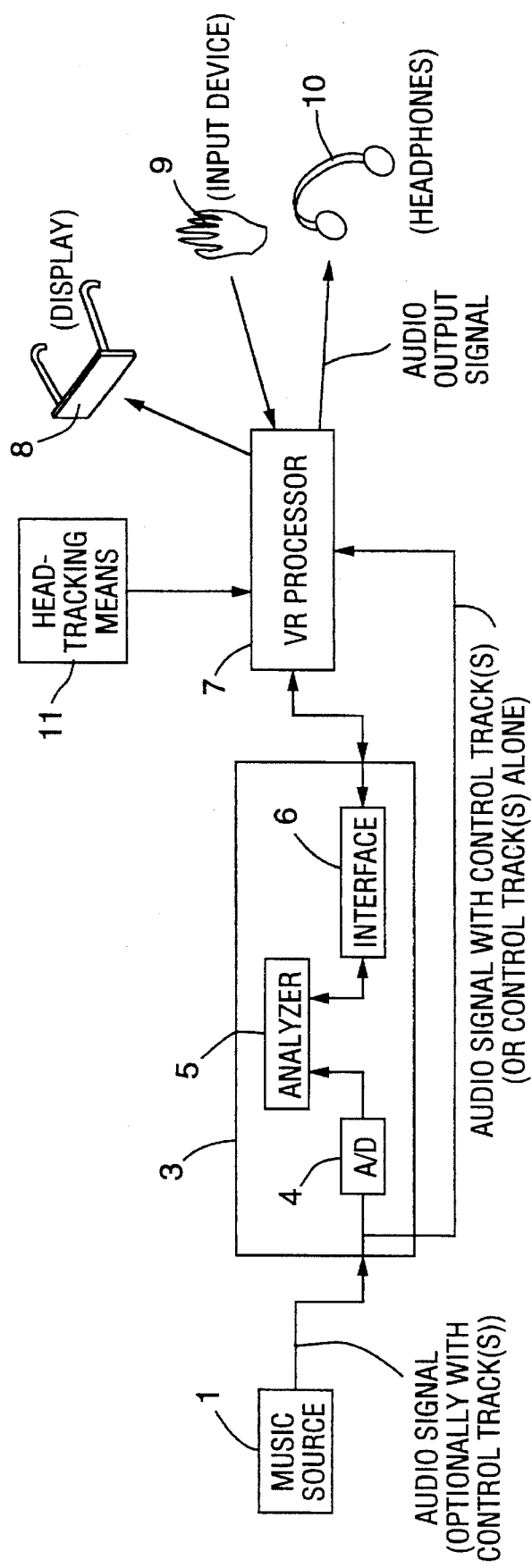
FIG. 1 is a diagram of a preferred embodiment of the inventive system, in which a music source is interfaced to a VR system by an Acoustic Etch system. The blocks may or may not represent physically distinct objects (several of the blocks could be implemented in a single device).

FIG. 1 is a diagram of a preferred embodiment of the inventive system. In FIG. 1, music source 1 is interfaced to VR processor 7 by Acoustic Etch system 3. VR processor 7 is a computer programmed with software for implementing a virtual environment. Specifically, VR processor 7 can cause image data representing a virtual environment to be displayed on display device 8 and can cause left and right channels of audio signals (simulating sounds in the virtual environment) to be played back to a user wearing headphones 10 (which include left and right speakers). Display device 8 can be any of a variety of devices, such as a device which mounts on the head of a human user (preferably including left and right monitors for providing a stereoscopic display to the user), or a single flat screen display which outputs either a non-stereoscopic display or a stereoscopic display. Head-tracking means 11 (included in both the FIG. 1 and FIG. 2 embodiments) is provided for optionally providing input (to processor 7) indicative of the position of the head of a human user wearing a head-mounted embodiment of display device 8.

Processor 7 is a computer programmed with software enabling a human user to interact with the virtual environment by manipulating input device 9, whose output is supplied to processor 7. In one embodiment, input device 9 includes a glove and sensors mounted to the glove for detecting movements of a user's hand within the glove. In another embodiment, input device 9 includes a frame and sensors for producing output signals indicative of forces or torques exerted on the frame by a user. The frame is preferably mounted to display device 8 (or to a base supporting the display device) symmetrically with respect to an axis of symmetry the display device, with limited freedom to move relative thereto, and the sensors are preferably mounted at the ends of the limited range of motion of the frame.

An analog-to-digital conversion circuit within Acoustic Etch unit 3 receives and digitizes a music signal from source 1. The music signal is optionally accompanied by one or more prerecorded control tracks corresponding to the music signal, which control tracks are played back with the music signal. Analyzer 5 within Acoustic Etch unit 3 receives the digitized output of circuit 4, and generates control signals by processing the music signal (or both the music signal and the control tracks). The control signals output from analyzer 5 are supplied through interface 6 to VR processor 7, for use within processor 7 for controlling generation of the virtual environment. One or more of the control tracks (or both the music signal and one or more control tracks, or the music signal alone) can be supplied directly to VR processor 7, to enable processor 7 to cause headphones 10 to play the music signals, and to control generation of the virtual environment in response to the control tracks or music, such as if the functions of the Acoustic Etch unit are embodied in the VR processor.

In the FIG. 1 system, the control track is optionally prerecorded on the same medium as the music signal corresponding thereto. Acoustic Etch unit 3 can, in effect, extract the control track from the medium and pass it (or a control signal generated therefrom) to VR processor 7.

Figure 2:
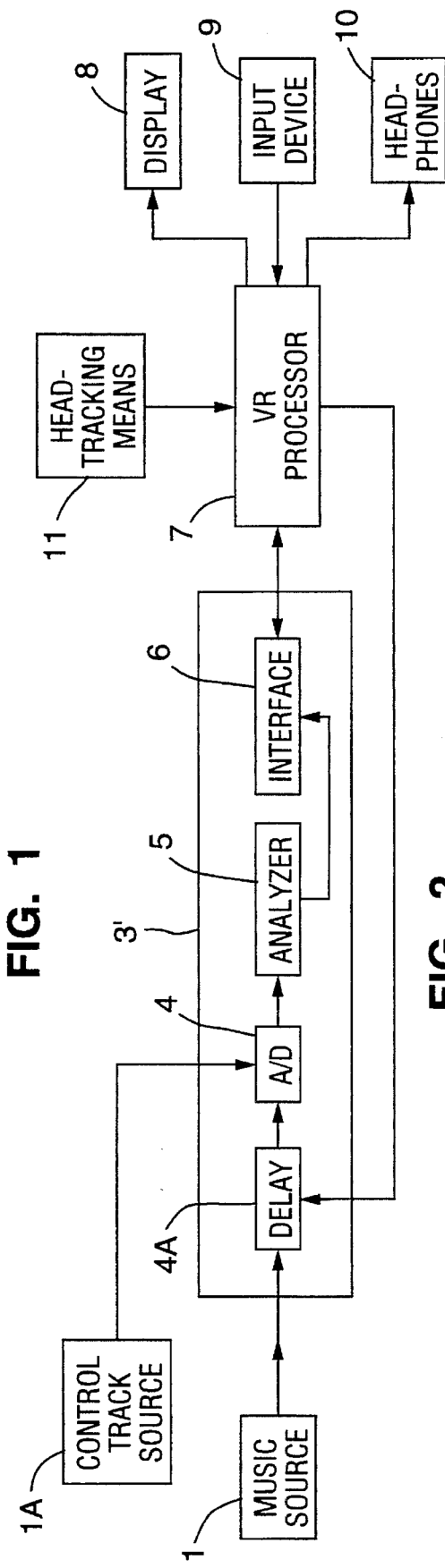
FIG. 2 is a diagram of a variation on the Fig. 1 embodiment, in which the Acoustic Etch system receives or contains prerecorded control tracks, and music corresponding to the control tracks is used to cue output of the stored control tracks to the VR processor.

FIG. 2 shows a variation on the system of Fig. 1 in which a control track and a corresponding music signal are recorded on (and played back from) different media (one from source 1A; the other from source 1).

For example, the control track can be recorded on, and played back from, a cartridge (1A) for a video game machine and the music can be recorded on, and played back from, a CD (1). The cartridge could be synchronized to the CD either by an electrical or other connection, or by the user, or by means used by the audio industry such as the SMPTE standard. This is a simple approach in the sense that the control track can be created (and prerecorded) in advance by a user listening to the same music.

Then, the CD can be played again and synchronized with the recorded control track to trigger processing of the recorded control track in the Acoustic Etch unit (without the need to re-record the CD with control track information). Note that the cartridge can be part of a separate unit that is interfaced to the Acoustic Etch, or it can be part of the Acoustic Etch.

It may be desirable to delay the music which is heard by the user with respect to the control track and/or the music used for analysis by the Acoustic Etch. In this manner, system delays can be compensated for, and better causality between music and visual images produced by the VR system can be achieved.

The Acoustic Etch can set and control parameters in the VR processor, and the VR processor can set and control parameters in the Acoustic Etch. For example, VR processor 7 can set the delay time for which the music is delayed in circuit 4A (or such delay time can otherwise be set) to compensate for the delay time required for processor 7 to process control signals produced from the control tracks or control signals generated from the analyzed music (such as by changing a displayed virtual object in response to one such control signal). The delayed music from circuit 4A and the control tracks from source 1A are processed in elements 4–7 in the same manner as non-delayed music and control tracks are processed in corresponding elements 4–7 of FIG. 1. Thus, in the FIG. 2 embodiment, the delay introduced by delay circuit 4A can be set so that VR processor 7 receives a segment of the music signal at precisely the time it completes the processing of control data from a portion of the control track corresponding to such segment of the music signal. In FIG. 1, the advantages of delaying the musical source can be achieved by either recording the control track earlier in time on the music source medium, or by delaying the music signal within the Acoustic Etch unit or the VR processor or by a separate audio delay box.

Figure 3:
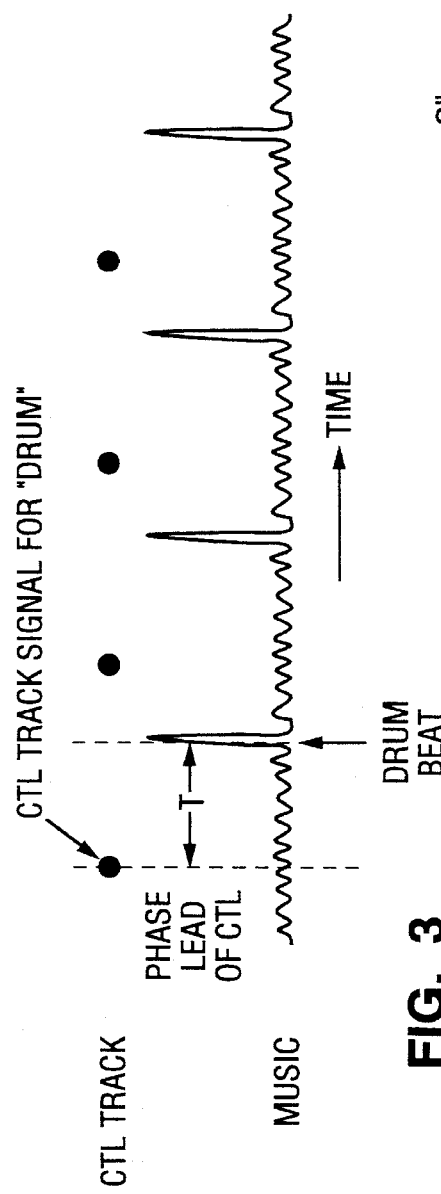
FIG. 3 is a graph of a control track and a corresponding music signal, where the control track is phase shifted relative to the music signal by a degree adequate to compensate for delays that are expected to be introduced, in other parts of the system, during processing initiated in response to the control track.

In the upper graph of FIG. 3, each dot represents a pulse of a control track. The lower graph of FIG. 3 represents a delayed version of a music signal produced by a drum and corresponding to this control track (in the lower graph, vertical displacement represents amplitude of the drum beat and the horizontal axis represents time). Each pulse of the control track corresponds to a peak amplitude of the music signal. However, the music signal of FIG. 3 has been delayed (phase shifted) by a delay period T (such as by remaining in delay circuit 4A) chosen to compensate for processing delays that are expected to be introduced in other parts of the inventive system (such as the VR processor) in order to accomplish processing initiated in response to the control track (or control signals generated from the control track, or control signals generated from analyzed music).

Figure 4:
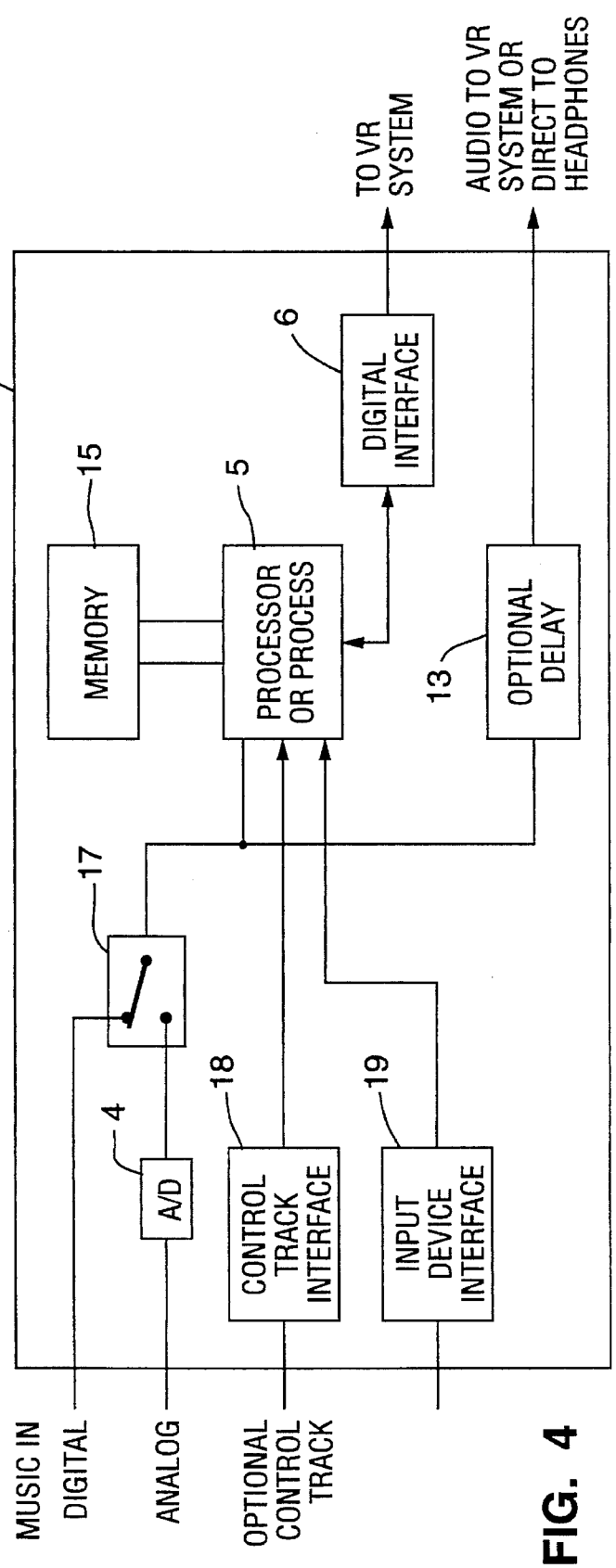
FIG. 4 is a block diagram of a variation on the Acoustic Etch apparatus employed in the FIG. 1 system.

FIG. 4 is a block diagram of a variation (Acoustic Etch unit 3″) of Acoustic Etch unit 3 which is employed in the FIG. 1 system. FIG. 4 implements an optional method for compensating for the delay introduced by the analysis of the control track or the music and the manipulation of the virtual environment. Acoustic Etch unit 3″ of FIG. 4 can receive digital prerecorded music and/or control track or analog prerecorded music and/or control track. Each such analog signal is digitized in A-to-D converter 4 and then supplied to one input of switch 17. The other input of switch 17 receives the digital music signals. Switch 17 is controlled to select one of the two inputs, and is connected so as to supply the selected signal to processor 5 (which can implement computer software stored in memory 15).

Delay circuit 13 can be operated to delay the music signal corresponding to the control track(s) to enable activity in the virtual world to appear to be synchronized or even non-causal. This is important because the delay between hearing an event (such as through headphones 10) and seeing action as a result (on display device 8) is disconcerting. In the real world one usually sees the event then hears the sound. In the virtual case (without delay circuit 13), one would hear sound (e.g., thunder) and then VR processor 7 would draw a corresponding visual event (e.g., lightning) so that user would see the visual event a fraction of a second later. This is the exact opposite of what one is used to in the real world where one sees an event and then hears the result. The amount of delay implemented by circuit 13 will typically need to be constant or shifted during a silent period or the user will perceive the pitch of the sounds (e.g., heard through headphones 10) as having changed as the amount of delay is adjusted.

With reference again to FIG. 3, in a variation on the scheme implemented by delay unit 4A (of Fig. 2) or delay circuit 13 of FIG. 4) instead of delaying the music, a pre-selected delay between music and control tracks is implemented at the time when both the control tracks and the music are prerecorded. The control track is, in effect, phase shifted in advance to account for lags expected to be introduced by the analysis (i.e., the time required by analyzer 5 of FIG. 2 to generate control signals from music) and/or by VR graphics system 7. The advantage of implementing this phase shifting when prerecording the control track(s) is that it minimizes the hardware required to implement the Acoustic Etch unit. There is also no need to delay the music, which could be expensive.

To summarize, because there is inherently a finite amount of time between the receipt of control track or digitized audio information and the time a VR system can cause a change in its visual output in response to the received information, preferred embodiments of the invention will implement one of two delay compensation techniques. One of the techniques is to shift the control tracks in time relative to the audio information (musical tracks). For example, if the control tracks are shifted by 10 milliseconds (e.g., if the control tracks are played back with a lead time of 10 milliseconds prior to the corresponding audio), then the VR system would have 10 millisecond in which to create and display the objects (and then simultaneously display the objects and play the corresponding audio). By accounting for the delay time in this way, virtual objects can be displayed very closely in time with corresponding music with little noticeable time difference, or even a reversed time difference.

The second one of the delay compensation techniques is to delay the music that is being played (relative to the prerecorded control track which is also being played back). This can be done in a variety of ways including but not limited to the use of a digital delay box between the music source (e.g., tape player 200 shown in FIG. 6, described below) track and an amplifier which receives the music from the source (e.g., amplifier 210 of FIG. 6). Alternatively, the music can be delayed, and then replayed and processed, by a digital VR computer itself (e.g., VR system 250 of FIG. 6), if the VR computer has digital-to-analog audio capabilities (e.g., means for converting the replayed digital audio into analog signals such as signals 250L and 250R of FIG. 6 for transmission to headphones worn by the user).

With reference again to FIG. 4, unit 3″ typically extracts control information from the input music or control track(s)

or both. Processor 5 and memory 15 and optionally also associated peripheral hardware (not shown) implement the extraction of the control information from a control track and/or from the music itself. The FIG. 4 system includes both a digital and an analog input port for the input audio. In a consumer product, only one of these would be used and the other left out for cost savings. Since most music is stereo, usually there would in fact be two (left and right) channels of audio output from switch 17 although probably only one processor 5 for receiving and processing both channels. Control track interface 18 of unit 3" receives one or more prerecorded control tracks and converts them (if necessary) into form for processing by processor 5. Input device interface 19 receives input signals, generated in response to user manipulation of an input device, and converts them (if necessary) into form for processing by processor 5 (processor 5 can then generate control signals therefrom).

An important advantage of the FIG. 4 embodiment is in its flexibility to modify and expand the capabilities of the algorithms implemented by processor 5.

In operation, the FIG. 4 device takes in music and processor 5 processes it to produce control information. The control information is then passed on to the VR computer which is actually rendering the virtual environment. Although in FIG. 4, delay element 13 is within Acoustic Etch unit 3", it could alternatively be physically located in the VR computer system itself, or external to both.

One embodiment of the internal algorithms that can be implemented by processor 5 (which is sometimes referred to herein as "analyzer" 5) of Acoustic Etch unit 3" are those related to simple filtering and analysis. In this case, means are provided (for example within processor 5) for filtering the incoming music, so that processor 5 can analyze the music in terms of its spectral components. By examining the level of a particular frequency range processor 5 can make a determination as to the rhythm or beat of the music. The beat of the music is passed on to the VR system which can then perform operations such as displaying virtual hands clapping in time to the beat of the music. The overall level of the music could be used to determine how many pairs of clapping hands there are at any particular time. As the music rises and falls in overall level, the VR processor could create and destroy virtual objects.

When the Acoustic Etch unit is used in conjunction with a control track, the potential complexity and richness of the virtual environment is enhanced. Processor 5 of Acoustic Etch unit 3" could extract the control track from either the music media or process a prerecorded control track from a separate source. Processing of a control track (or a control signal generated therefrom, rather than from a corresponding music signal) within the VR processor is more powerful than analysis of music in the Acoustic Etch followed by processing of the resulting control signal in the VR processor, because it does not have to be quickly determined and enables the VR processor to respond to control track information not present in the music. At the start of or before the start of the song, for example, the control track could contain compressed images of the performers. As the song is played, the control track is processed by the Acoustic Etch unit which instructs the VR system to show the images of the performers texture mapped onto dancing characters which dance in time to the music. Note that the Acoustic Etch unit could be incorporated as part of another device, e.g., the player of the input music signal or the prerecorded control tracks or the VR system. One can imagine the integration of an Acoustic Etch unit into a cartridge for a video game machine with CD capability, for example. A program in the cartridge and a track on the CD would be employed or both could be contained on the CD. In addition to minimizing the cables, this is also cost effective.

The audio can bypass the VR system and go directly to headphones 10, however, note that in FIGS. 1 and 2, the music is passed through VR processor 7 rather than directly into the headphones 10. In this way the VR processor may convolve the sound in such a way as to create the illusion of having it coming from a particular location in the virtual environment.

In summary, the invention is a novel way of interfacing music to VR. The inventive apparatus stands in contrast to traditional approaches which have tried to interface VR to music. The inventive apparatus allows for the highly produced and refined qualities of music to be expressed in a virtual environment.

There are several exciting possibilities with this apparatus and method. In the case of an Acoustic Etch unit which analyses music and controls a virtual environment of a dancer dancing, one could play any musical piece and the Acoustic Etch would extract the low frequency beat which would tell the VR system when to have the dancer step. Thus, one could watch a displayed (virtual) stick figure dancing in time. By using the delay mechanism disclosed, the virtual dancer and the music would occur far more synchronously than if the music was not delayed.

System cost may be reduced by incorporating the delay in the music player itself. Many current digital units employ a delay for error correction.

Employing the control track method with the Acoustic Etch unit allows one to create more advanced choreographs and minimizes cost as the processing requirements would be much less.

The invention may also lead to new ways to analyze real time data streams in order to look for patterns and interesting sequences.

Figure 5:
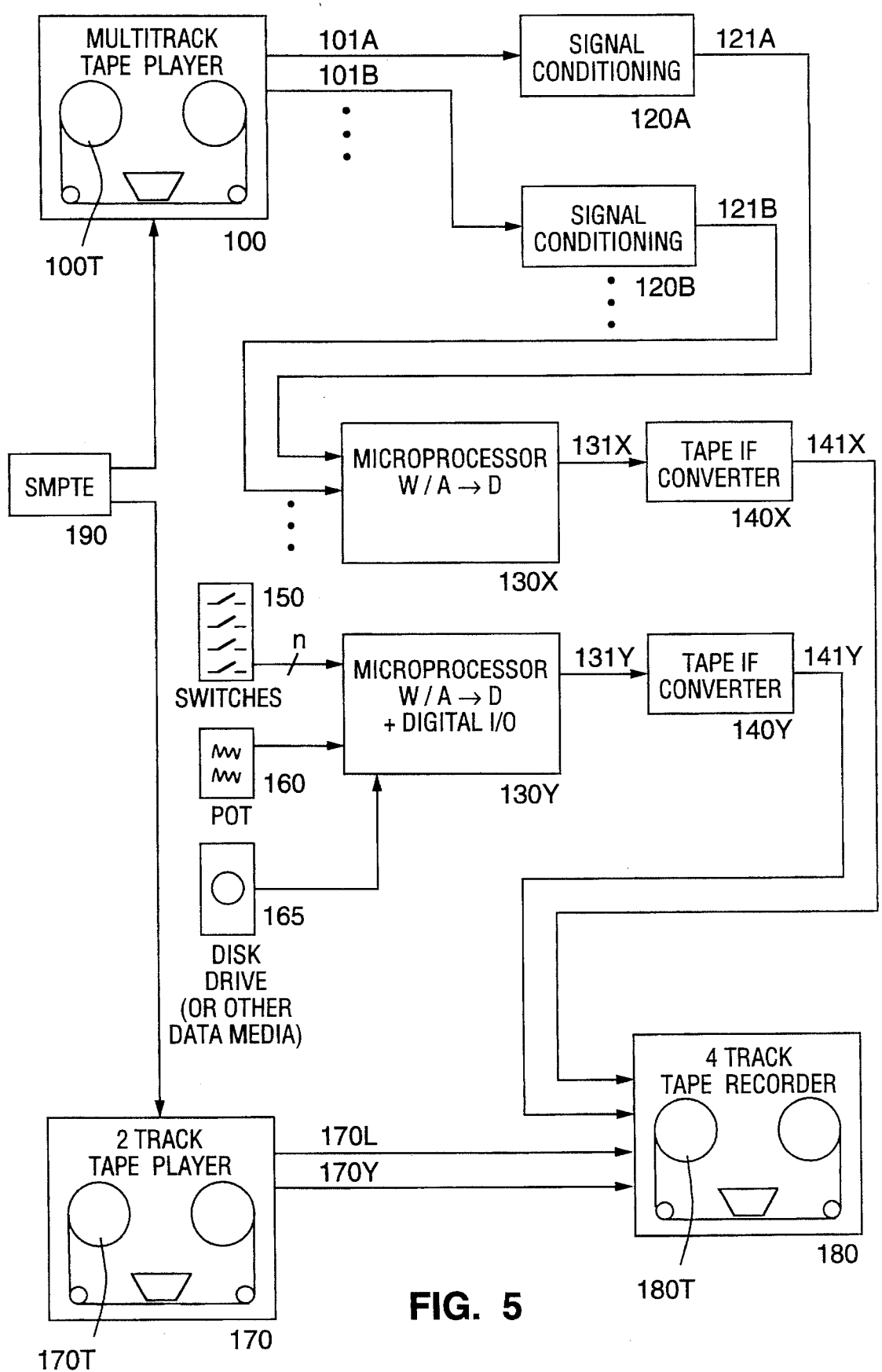
FIG. 5 is a block diagram of a system for creating an audio tape with control tracks for playback by the system shown in FIG. 6.
Figure 6:
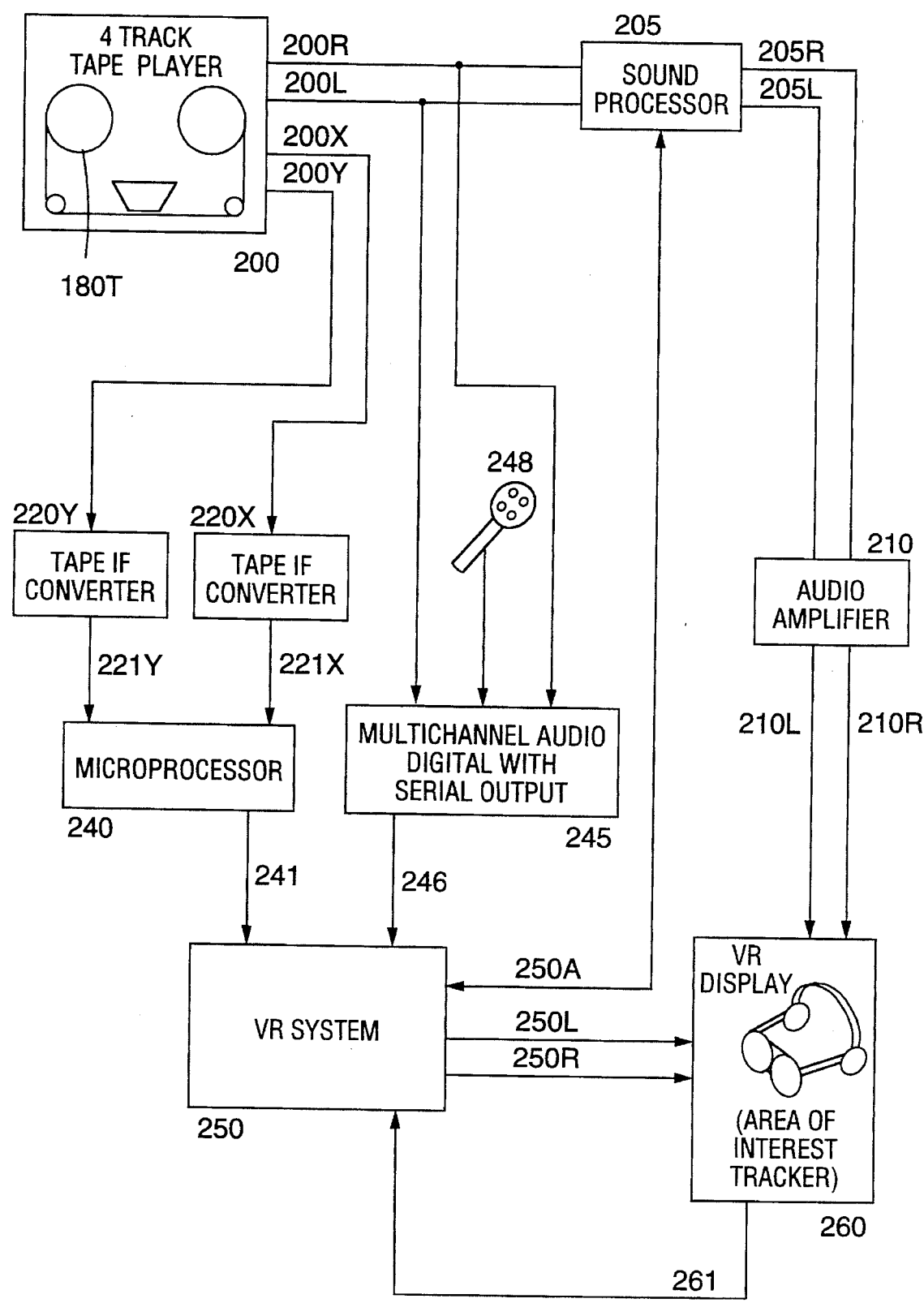
FIG. 6 is a block diagram of a system for playback of the audio tape produced by the FIG. 5 system.

Next, a more detailed description of a preferred implementation of the invention will be provided, with reference to FIGS. 5 and 6. FIG. 5 is a diagram of a system for creating an audio tape with control tracks, for use in the playback system shown in FIG. 6.

FIG. 5 shows Multitrack Tape Playback Unit 100, Multitrack Master Audio Tape 100T, Single channel audio signal 101A (output from 100), additional "n" Single channel audio signals 101B output from 100, Audio Signal Conditioning circuit 120A, additional "n" Audio Signal Conditioning circuits 120B, Analog Data Signal 121A, additional "n" Analog Data Signals 121B, Microprocessor Unit 130X with an "n" channel analog to digital converter, Serial Data Stream 131X, Tape interface (IF) Converter 140X, Audio Quality Data Signal 141X, switches (or other Digital Data Input Devices) 150, Analog Data Input Devices 160, Data Storage and Input Device 165, Microprocessor Unit 130Y (including digital input and multiple channel analog to digital converter), Audio Quality Data Signal 131Y, Tape IF Converter 140Y, Audio Quality Data Signal 141Y, Two-Track Audio Tape Playback Unit 170, Two-Track Master Tape 170T, Left Channel Audio Signal 170L, Right Channel Audio Signal 170R, 4-Track Audio Tape Recorder 180, 4-Track Audio and Virtual Control Track Tape 180T, and SMPTE Synchronizer 190.

FIG. 6 shows 4-Track Audio and Virtual Control Track Tape 180T, 4-Track Tape Player 200, Right Channel Audio Signal 200R, Left Channel Audio Signal 200L, X-Channel control signal 200X, Y-Channel control signal 200Y, sound processor 205, 2-Channel Audio Amplifier 210, audio signals 205R, 205L, 210R, and 210L, Tape IF Converter 220X, Tape IF Converter 220Y, Microprocessor Unit with two-channel analog to digital converter 240, Serial Data Stream 241, serial data stream 250A, multi-channel Analog-to-Digital Converter 245 with serial data output, Serial Data Stream 246, Microphone 248, Virtual Reality Graphics System 250, Left Eye Video Signal 250L, Right Eye Video Signal 250R, Virtual Reality Audio and Visual Display Unit 260 (with Headtracking means), and Head Tracking Signal 261.

With reference to FIG. 5, multitrack tape player unit 100 is of the type typically found in audio recording studios. Unit 100 is loaded with a multitrack master tape 100T and outputs multiple channels of audio (typically music) signals 101A, 101B, and so on.

These signals are fed to signal conditioners 120A, 120B and so on, via standard audio patch cords. Each of the signal conditioners consists of electronic circuitry, and each outputs an analog control signal (121A or 121B) which is fed to one of the analog input pins of microprocessor unit 130X. Microprocessor 130X can be, for example, a M68HC11EVBU Universal Evaluation Board made by the Motorola Company, and is programmed with software for generating a control track from the conditioned audio data that it receives, and outputting a serial data stream to tape IF converter 140X. Tape IF converter 140X is comprised of electronic circuitry and outputs a data signal 141X (indicative of the control track) of the type that can be stored on standard audio magnetic tape. This signal is fed to 4-track audio tape recording unit 180 that is loaded with a 4-track audio cassette tape 180T.

An assembly of switches (or other means by which a human operator can input digital signals) 150 feeds parallel digital data to microprocessor 130Y (which can be identical to or similar in type to microprocessor 130X). Also connected to microprocessor Unit 130Y are analog input devices 160 (such as a "multiple degree of freedom" joystick or other input device), and a data storage device 165. Device 165 can be a magnetic disk drive or other data storage and retrieval device (or alternatively, a data entry device). Microprocessor Unit 130Y is programmed with software for generating a control track in response to the input data it receives, and outputs a serial data stream to a tape IF converter 140Y. Tape IF converter 140Y is comprised of electronic circuitry and outputs a data signal 141Y (indicative of the control track) of the type that can be stored on standard audio magnetic tape. This signal is fed to four-track audio tape recording unit 180.

A two-track tape playing unit 170 is loaded with a two track mixed down master tape 170T and is time synchronized with the multitrack unit 100 via SMPTE synchronizer 190 or other such device. The two-track tape player 170 outputs a left audio signal 170L and a right audio signal 170R that are input to the 4 track tape recorder 180. Recorded cassette tape 180T thus has two tracks containing audio signals 170L and 170R (which are typically music signals), and two other tracks containing control tracks corresponding to the audio signals.

FIG. 6 represents the system used to play back and experience the audio tape 180T (which has control tracks). A four-track audio tape player 200 outputs four audio signals: left and right audio signals 200R and 200L, and control track signals 200X and 200Y consisting of data encoded as audio signals. Signals 200X and 200Y are input to two tape IF converters 220Y and 220X which extract serial data streams 221Y and 221X therefrom, which streams are input to a microprocessor unit 240 of a type identical (or similar) to microprocessor unit 130X. Microprocessor unit 240 is programmed with software for generating control signals for VR graphics system 250 in response to one or both of data streams 221Y and 221X, and outputs a serial data stream indicative of such control signals to virtual reality (VR) graphics system 250, which can be, for example, a Silicon Graphics Crimson Computer with Reality Engine graphics, serial port board, and VLIB software available from Fakespace, Inc. (of Menlo Park, Calif.).

VR system 250 outputs two video signals 250L and 250R representing the left and right eye viewpoints of a virtual environment to head-coupled display unit 260.

Audio signals 200R and 200L are input to a sound processor 205, for example, a Convolvotron sound spatializer available from Crystal River Engineering (of Groveland, Calif.) or other sound processing equipment which feeds the processed sound signals 205R and 205L to an audio amplifier 210 which feeds two amplified audio signals 210R and 210L to head-coupled display unit 260. The audio signals 200R and 200L, and input from a microphone 248 are also input to multichannel audio digitizer 245 which outputs a serial data stream 246 to VR system 250.

Virtual reality system 250 also receives head position or other area of interest information from head-coupled display 260.

Figure 7:
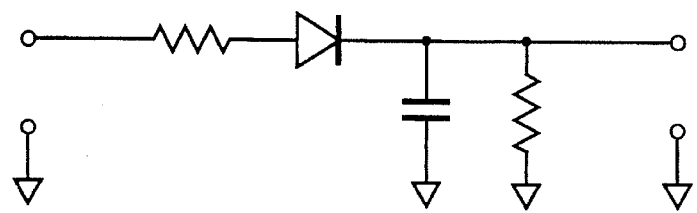
FIG. 7 is a schematic diagram of a circuit suitable for implementing any of signal conditioning blocks 120A and 120B.

FIG. 7 is a schematic diagram of a circuit fragment suitable for implementing any of signal conditioning blocks 120A and 120B. It consists of four electronic components.

Figure 8:
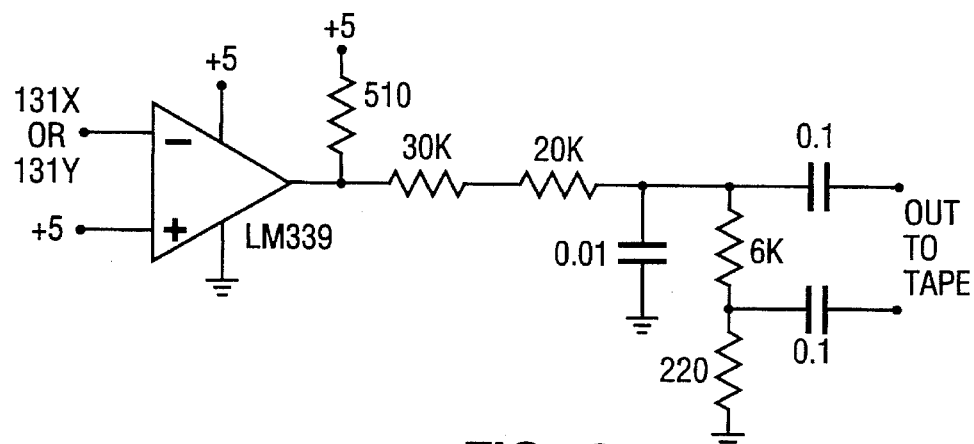
FIG. 8 is a schematic diagram of a circuit suitable for implementing either of tape IF convertors 140X or 140Y (of FIG. 5).

FIG. 8 is a schematic diagram of a circuit fragment suitable for implementing either of tape IF convertors 140X or 140Y. It consists of various electronic components.

Figure 9:
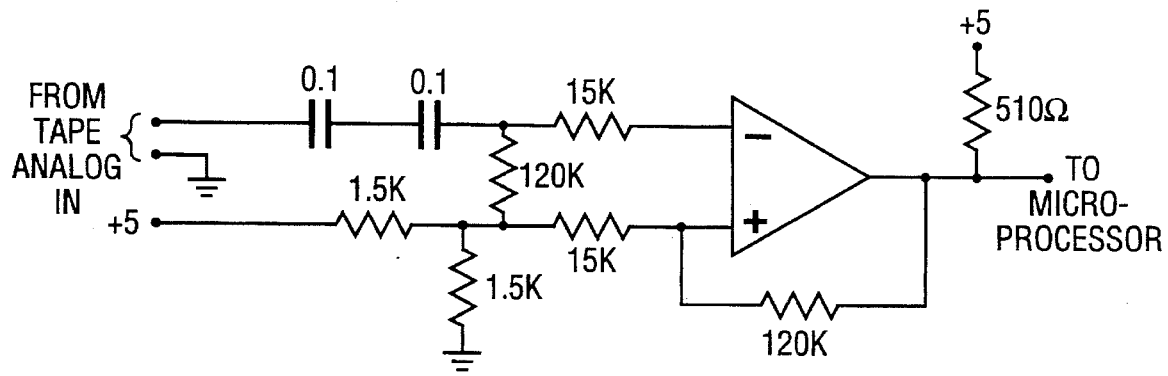
FIG. 9 is a schematic diagram of a circuit suitable for implementing either of tape IF convertors 220X or 220Y (of FIG. 6).

FIG. 9 is a schematic diagram of a circuit fragment suitable for implementing either of tape IF convertors 220X or 220Y. It consists of various electronic components.

Figure 10:
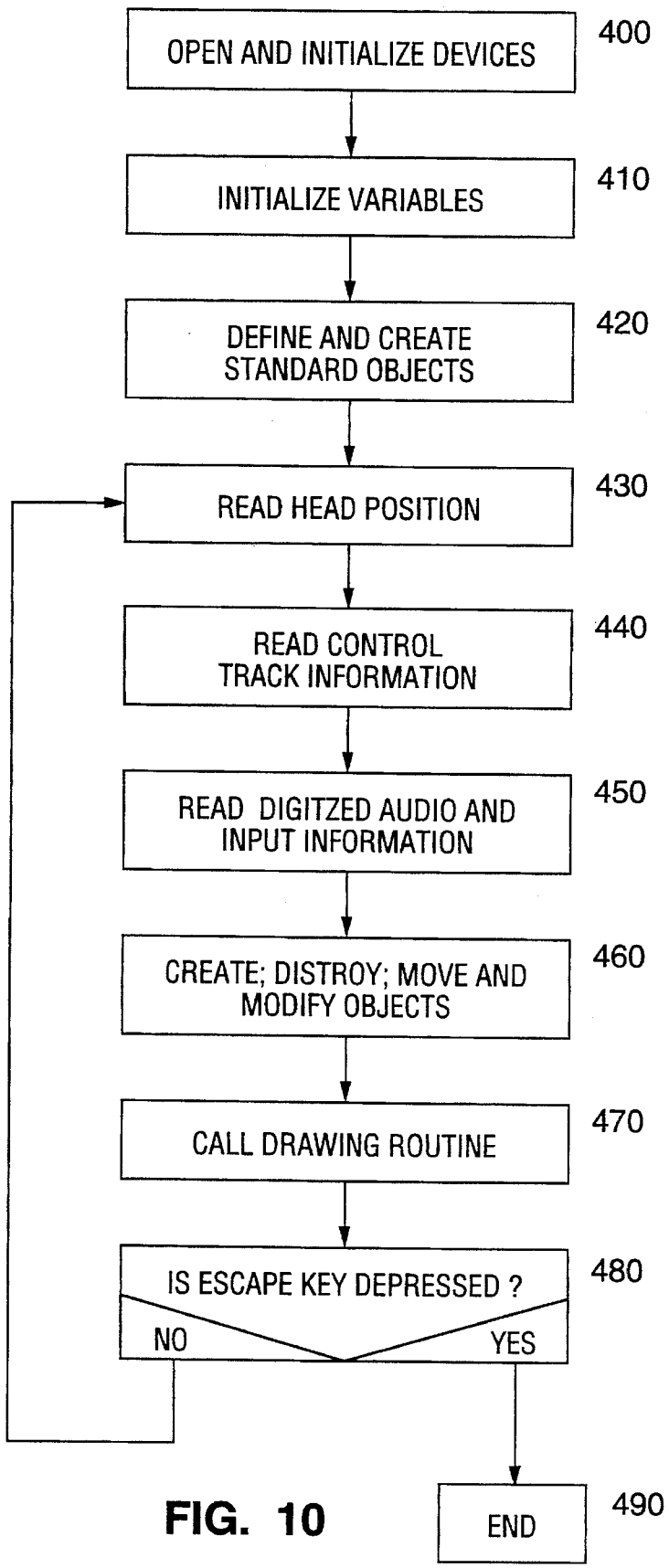
FIG. 10 is a block level description of the software which is preferably run on VR system 250 of FIG. 6.

FIG. 10 is a block level description of the software which is preferably run on VR system 250 of FIG. 6.

Figure 11:
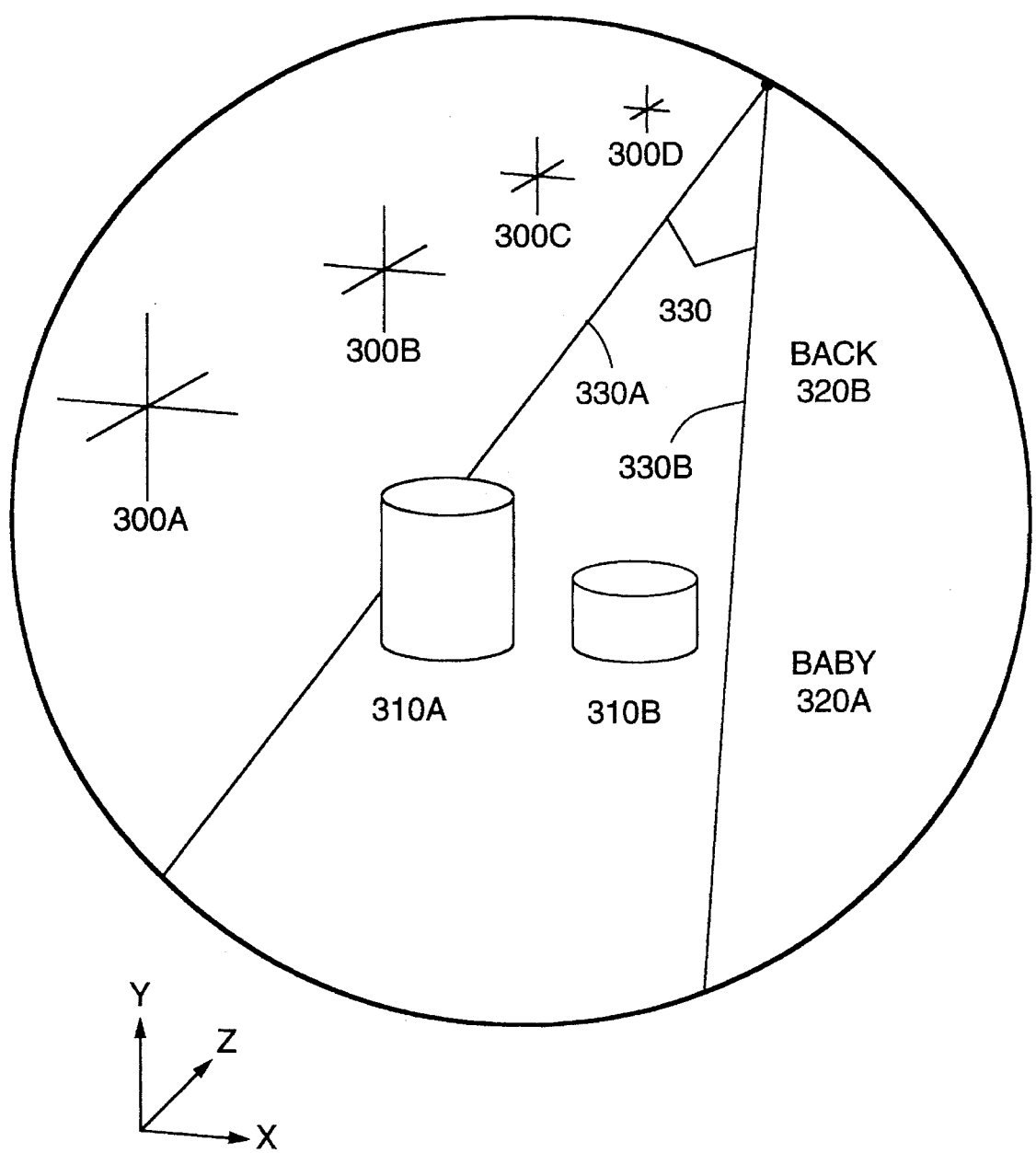
FIG. 11 is a representation of a typical single eye image as displayed on display 260 of Fig. 6.

FIG. 11 represents a typical single eye image as displayed on the display 260. Images are virtual objects. Objects 300A, 300B, 300C, and 300D are objects comprised of three orthogonal lines of the same size that are positioned at the same x and y location, but recede backwards form the user along the z axis over time. Objects 310A and 310B are fixed in space, but change height over time. Lines 330 (including lines 330A and 330B) are fixed in space and remain stationary over time. Words BABY 320A and BACK 320B are fixed along the XY plane and have no depth in along the Z axis.

In operation, the systems of FIG. 5 and 6 can implement the following embodiment of the invention. The overall process can be broken into two halves: the recording of the medium and the playback. Figure 5 represents the recording phase while FIG. 6 represents the playback phase.

In FIG. 5, a multitrack tape playing unit 100 is of the type typically found in professional recording studios. It is loaded with the master tape 100T that recorded the raw and unmixed audio efforts of artists recording a song. In the typical production of recorded music products, this tape is later mixed and processed to produce a two-track master tape 170T which is later mass produced for the consumer market. The multitrack master tape 100T and the two track master tape 170T are playing at the same time in synchronization with each other through the use of a standard commercially available time synchronization unit, for example SMPTE synchronizer 190 that works in conjunction with the tape playing units 100 and 170.

In this embodiment, the 2-track audio signals 170L and 170R are recorded on 4-track tape 180T via a standard four track tape recording unit 180. This unit can be a consumer type 4-track cassette tape unit, or a high quality professional tape recorder that will produce a master tape for acoustic etch type tapes. The audio signals 170L and 170R represent the original audio content of a commercial tape and are not typically processed further. That is to say that two tracks of four-track tape 180T are the music that the user of the tape would expect to hear without the Acoustic Etch device of the invention. However, it may be desired to delay the music in time with respect to the control tracks.

The other two tracks that are recorded from signals 141X and 141Y are the control tracks that are derived as shown in FIG. 5 and will be used during playback to create and control and manipulate the virtual environment that a user experiences while listening to the original audio signals.

While there are a multitude of ways to create these control tracks, this embodiment generates such tracks in either (or both) of two ways. The first way automatically derives control signals from original multitrack master tape 100T and the second way allows a human operator to create control signals via input means 150 and 160 and a computer data storage device 165.

To create the control track in the first way, the "n" multiple audio output channels 101A, 101B and so on, which represent each audio channel on the original multi-track tape 100T are fed into signal conditioning blocks 120A and 120B. These blocks serve to distill the audio information on each track into a lower frequency signal that will serve as an aesthetically valuable control variable in the virtual environment. In the preferred embodiment, it has been determined that a modified peak detection circuit serves this function very well. An example of this circuit is shown in FIG. 7. It is important to point out that there are many forms of signal processing which can be used to derive this control signal and the FIG. 7 circuit is a simple one which works well for some cases only. A variety of digital signal processing techniques and analog signal processing techniques may be used which include, but are not limited to, phase detection, frequency spectrum analysis, phase vocoding techniques and so forth. Additionally, the signals can be processed to produce control signals which are in some way related to the perceived three-dimensional spatial structure of the original music signal. The signals output from the "n" signal conditioning blocks are fed into the analog signal input ports of microprocessor unit 130X. If "n" is less than or equal to seven, a standard microprocessor card product such as the M68HC11EVBU available from Motorola Corporation can be used. This microprocessor is programmed to successively read each channel and to then output the magnitude of each channel in a serial data stream 131X to a tape IF converter 140X. An example code fragment which outputs a test data block of ASCII characters to tape IF converter 140X is included for reference in Appendix A of this disclosure. The desired analog data should be read with the microcontroller within unit 240 and used in a fashion similar to the ASCII characters in the code fragment. Instructions on how to program this are described in Motorola publications M68HC11EVBU/AD1 and M68FCASS/AD1and further literature, all provided with the MC68HC11EVBU product by Motorola.

A circuit diagram fragment for tape IF converter 140X is shown in FIG. 8. We contemplate that RS232-to-tape or MIDI-to-tape units could be used as substitutes for the IF converters described herein. This converter type is described in the book *Microcomputer Interfacing* by Harold S. Stone and can be built in a variety of ways. This circuit takes the serial data stream which represents the conditioned levels of the "n" channels of information from the multitrack master tape and converts this serial data to a format 141X that can be recorded on standard audio tape. In this fashion, the control track is recorded side by side with the original two tracks of audio information.

In addition to the information derived from the multitrack master tape, it is desirable for control information to be produced manually by a human operator. This information may take on many forms and can (in many applications) practically be generated only by a human operator. Elements that an operator may wish to control include: display modes that correspond to overall thematic changes in a musical score or special analog controls that relate to quickly paced musical expressions. Elements of these types may be easily input via digital switches 150 or analog controls 160. Likewise, the operator may wish to include information that will later be used by the playback (Acoustic Etch) system. This information could include for example, digital photographs of the musical artists, or textual information that corresponds to the words or themes in the music. This information can also be input via a disk drive 165 or other type of electronic data storage and retrieval mechanism or directly by a computer system. Such information may be created in a multiple of ways including paint programs, 3D modeling programs, digitizing scanners and so on. This information could also consist of system codes and program codes for the VR system 250.

All these alternative controls and information are fed into the microprocessor unit 130Y which contains a program similar to that with which microprocessor unit 130X is programmed. The program for unit 130Y contains additional code that reads the digital I/O ports on the unit in addition to the standard code which reads the analog to digital ports as for microprocessor unit 130X.

The output data (indicative of a control track) is fed to tape IF converter 140Y in a manner similar to that for microprocessor 130X and signal 131X. The converted data stream 141Y output from converter 140Y is then recorded on the remaining track of tape 180T.

FIG. 6 describes the playback phase of the invention. A mass produced copy of the four-track tape 180T, or the actual tape 180T is loaded into a four-track tape playing unit 200. This unit plays the tape and produces 4 audio signals, two of which are standard signals meant to be listened to, while the two others contain control track data that will be processed and sent to VR system 250. The two music audio signals 200R and 200L are fed to a sound processor system which can process the audio signals 200R and 200L in response to control signals 250A from the VR system. The processed audio signals 205R and 205L are fed to an audio amplifier 210 which drives a pair of stereophonic headphones 260 or speakers for the user to listen with.

The other two signals 200X and 200Y are fed to tape IF converters 220Y and 220X which translate the audio signal format control track data into a digital form 221X and 221Y. A circuit diagram fragment for tape IF converter 220Y or 220X is shown in FIG. 9. This converter type is described in the book *Micropcomputer Interfacing* by Harold S. Stone.

Microprocessor unit 240 then combines both control signals 221Y and 221X and converts this digital data into a serial data stream suitable for processing by the VR system, for example in the format of an RS232 or MIDI data stream. An example code fragment which accepts a test data block of ASCII characters from tape IF converter 220X or 220Y is included for reference in Appendix A. The desired data should be read with a microcontroller in a suitable format. Instructions on how to program this are described in Motorola publications M68HC113VBU/AD1 and M68FCASS/AD1 and further literature, all provided with the M68HC11EVBU product from Motorola.

The music audio signals are also fed to a multichannel audio digitizer 245 with a serial data output that is read by VR system 250. This digitizer converts the music audio signals to digital form for processing by VR system 250, and can also convert other audio sources such as a live microphone 248.

The VR system receives three signals: a signal 261 representing head position and orientation from the VR display 260 or other forms of area of interest tracking information (such as that from an input device of any of the types described above with reference to input device 9 of FIG. 1); a control and data tape signal 241 that is related to the control tracks prerecorded on four-track tape 180T; and digitized audio signals 246 that digitally represent the original audio (which is typically music), and/or any other audio source desired, such as a live microphone 248.

In a preferred embodiment, a VR system 250 comprises a Silicon Graphics Crimson computer outfitted with Reality Engine graphics, a serial port card, and the GL software library and the Fakespace, Inc. VLIB Virtual Reality software package.

In addition to systems administration and miscellaneous programs, the VR system runs the program (comprising steps 400, 410, 420, 430, 440, 450, 460, 470, 480, and 490) which is shown and described in FIG. 16. This program begins by opening the serial port and initializing attached devices (step 400) and then goes on to initializing variables (step 410). The program then creates a table of virtual objects (step 420). Each object comprises an x, y and z location and a geometric description of the object that conforms to GL and VLIB software requirements. A standard set of objects is defined and created and will later be controlled in response to one or both of control signal 241 (representing data in one or more prerecorded control tracks) and audio signal 246.

The system then reads the head position of the tracker 260 (step 430) and then reads the "control track" control signal 241 and audio control signal 246 (steps 440 and 450). In response to this information, any number of programs can be implemented (step 460) to control and create and manipulate the virtual environment in a manner choreographed with the original music signal.

One example of such a virtual reality (VR) program will next be described. This example (which assumes that the VR processor receives both a music signal, and control track information from a prerecorded control track corresponding to the music signal) is provided for illustrative purposes only, and should not be construed to limit the scope of the invention, as broadly defined.

The VR program initially reads the control track information, which may precede the music information on a prerecorded tape (such as tape 180T played by playback device 200 of FIG. 6). The control track information may have been created by an operator during recording of the tape (e.g., using the above-described FIG. 5 apparatus) and can contain descriptions of virtual objects, virtual reality system settings, virtual reality hardware and software settings. The control track information may also contain the body of a software program to be run on the VR processor, in which case the VR program initially residing on the VR processor serves only as a monitor with which to read the program defined by the control track information.

After the control track data is read by the VR program, the VR system reads any digitized music information which corresponds to the control track data, and/or the output of any input devices that are connected to the VR system such as instrument gloves, six-degree-of-freedom trackers, custom human input devices, mice, and the like.

The VR program then creates, destroys, moves or modifies the virtual environment, or virtual objects therein. This can be done using standard VR library software calls, and is preferable based upon all of the forms of data read by the system (including the control track information and corresponding music information) as described above.

Examples of virtual objects that can be created by the VR program will next be described with reference to the display of a virtual environment shown in FIG. 11. Two such virtual objects (310A and 310B) are cylinders of equal diameter and different height. Cylinders 310A and 310B themselves are default objects that are always available in the preferred VR program described herein. The bases of the cylinders are located at the same X and Y and Z location. Preferably, the height of each cylinder is controlled via the control track information and the two heights indirectly represent the first two audio channels 101A and 101B (which are typically music channels) of master tape 100T after being conditioned by the signal conditioners 120A and 120B. If these two audio channels are recordings of, say, a bass drum and a snare drum, then if the user chose to turn and face these objects, the user would see one cylinder (e.g., 310A) which appeared to change height in response to the bass drum, and another (e.g., 310B) which appeared to change height in response to the snare drum. The VR program can be easily written to display other objects in response to the same sounds or to display these or other objects in response to other aspects of the control track.

The data representing the text for objects 320A and 320B (of FIG. 11) is preferably loaded from the control track into the VR program while the tape is playing music and the VR program is running. While running (i.e., reading the control track information from the tape), the VR program loads these objects, along with instructions to display each object at a fixed X and Y (and optional Z) location when the VR program receives a certain signal on the control track. In this manner, lyrics or other song dependent data can be loaded into the VR program using a prerecorded control track, and then displayed based upon the prerecorded control track information. In the preferred VR program embodiment described herein, each of words 320A and 320B is displayed at the same time a singer (represented by a control track corresponding to the music signal) vocalizes the words in the music. In order to achieve this controlled timing, a human operator uses the switches 150 (of FIG. 5) to record the "display" signal as part of the control track, and uses the data in storage device 165 to load the song dependent data.

A model of object 300A (which is shown at later times at positions 300B, 300C, and so on) is loaded into the VR program directly from the control track. After the VR program has loaded the model, the control track instructs the VR program to display the object upon detecting a certain threshold of energy at a specific frequency band of the music information. The VR program performs a spectral analysis of the digitized music information (e.g., digital data 246 in FIG. 6) and tests the specified frequency band for energy level. Upon detecting the threshold level, the VR program creates (displays) the object at a given X, Y, and Z location.

Regardless of the status of the spectrum analysis, the VR program automatically changes the Z location (at which the object is to be displayed) by a certain amount once per each increment of elapsed time during running of the program. In this fashion the object 300A can be displayed in a manner so that it appears to recede backwards toward position 300B, and then to position 300C, and so on. A new object would appear on the display at the initial X, Y, and Z location only at instants coinciding with a certain music event, and thus an intermittent stream of objects with a relationship to the frequency content of the source music would appear.

We next discuss several variations on the above-described embodiments of the invention.

The VR processor itself can play digitized music. For example, VR system 250 of FIG. 6 can play digitized music (e.g., generate original music), rather than merely routing digitized music from an external source (e.g., digitizer 245 of FIG. 6).

Sound processing equipment (such as sound processor 205 shown in FIG. 6) can optionally be connected between audio source 200 and amplifier 210. If the sound processing equipment is a convolvotron, then the apparent location of the source of the music (when it is output to the user from speakers) can be altered. The sound processing equipment can be controlled to operate in response to the control track information (or in response to the analyzed audio), and the audio (which is typically music) can thus be used to describe as well as control virtual objects, and the control track information (or analyzed audio) can be used to process the audio heard by the user to relocate the apparent source thereof. This technique allows for a much greater realism and correspondence between music and the virtual environment and its objects (assuming that the user wears a head-mounted display, which is preferably a stereoscopic display, along with headphones, so that the user immersively experiences the virtual environment including three-dimensional placement of its virtual objects, using both the senses of sight and hearing).

The audio (e.g., music) can be analyzed (e.g., by analyzer 5 of FIG. 1 or 2) to determine certain aspects of its original three-dimensional nature. One embodiment of this would analyze the delay between right ear and left ear correlated sounds. This delay can then be mapped roughly to an angle relative to the user's head orientation.

The foregoing describes two basic methods to enable the user to experience sounds with a controlled apparent source location: one is to convolve the sound and place it in space; the other is to analyze the sound and determine where the user will think it is placed in space.

Many conventional recording studios process music to achieve a three dimensional effect. Such processing information could be stored in the control track of the invention, for later use by a VR system to help place virtual objects and to set system parameters in instruments (such as a convolvotron) that may be used as part of the VR system. This would be especially useful if the music recording is made using binaural heads and other such spatial recording equipment and techniques.

The recording medium for the inventive prerecorded control tracks does not need to be a four-track audio tape. In fact, the compact disk (CD) and Digital Audio Tape (DAT) formats already offer control track capabilities. In addition to these capabilities, these and other formats can be modified to contain more control track information. For example, the prerecorded control track(s) need not be recorded as a separate track. In order to retrofit to existing consumer audio equipment, the control track information could be stored in a subsonic or supersonic fashion on the existing audio information. Provision of such subsonic modulations would decrease the data rate, and thus the signal conditioning blocks would need to have their values adjusted. Provision of such supersonic modulations would likely introduce difficulties when using audio tape systems to implement the invention.

The original multitrack and two-track tape machines employed in the systems of FIGS. 5 and 6 can be replaced by any form of an audio source. In the near future, it is expected that audio recording and playback devices suitable for use in embodiments of the invention, will be inexpensively implementable as completely digital machines.

FIGS. 5 and 6 describe a principally analog device, which can easily be implemented digitally, in alternative embodiments of the invention.

When prerecording the control track(s), the recording does not need to be performed in a continuous real-time fashion. It can be edited over time much as master audio tapes are created, using many passes to get it right, building up or deleting control track information in multiple passes.

It should be understood that components can be exchanged between the various embodiments described herein.

Various other modifications and alterations in the method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

APPENDIX A

```
0001                    ****************************************
0002                    ****** Tape IF Software for 68HC11 ******
0003                    ****************************************
0004                    ****** Copyright Fake Space Labs *********
0005                    ****** 1990 - By I.E.M and K.T.B ********
0006                    ****************************************
0007
0008                    * Buffalo definitions
0009
0010 1000               REGBS    EQU     $1000
0011 1003               PORTC    EQU     $1003    * Port C is input (Data from HP2020)
0012 1004               PORTB    EQU     $1004    * 0:5 - /OE for HP2020s  6: Hi/Lo byte 7: /Reset
0013 102b               BAUD     EQU     $102B
0014 102c               SCCR1    EQU     $102C
0015 102d               SCCR2    EQU     $102D
0016 102e               SCSR     EQU     $102E
0017 102f               SCDAT    EQU     $102F
0018
0019 100e               TCNT     EQU     $100E    * Timer 16 bits
0020 1018               TOC2     EQU     $1018    * Timer out comp 2
0021 1020               TCTL1    EQU     $1020    * Timer control
0022 1023               TFLG1    EQU     $1023
0023 1022               TMSK1    EQU     $1022
0024
0025 1010               TIC1     EQU     $1010    * TIMER INPUT CAPTURE 1
0026 1021               TCTL2    EQU     $1021    * Timer input capt ctl reg
0027
0028                    * Pseud vect for TIC1
0029
0030 00e8               ORG      $00E8
0031
0032 00e8 7e 01 87      JMP      TIC1INT
0033
0034 0100               ORG      $0100           * RAM 0100-01ff
0035
0036                    START
0037 0100 86 30         LDAA     #$30
0038 0102 b7 10 21      STAA     TCTL2           * Set TIC1 to capture on either edge
0039 0105 86 04         LDAA     #$04
0040 0107 b7 10 22      STAA     TMSK1           * Enable interrupts
0041
0042 010a 7f 01 83      CLR      DELTA
0043
0044 010d fc 10 0e      LDD      TCNT            * read timer
0045 0110 fd 01 81      STD      PEDGE           * current time stored in PEDGE
0046
0047 0113 c6 00         LDAB     #$00
0048 0115 f7 10 04      STAB     PORTB
0049
0050 0118 7c 01 85      INC      VALID
0051
0052 011b 0e            CLI
0053
0054                    LOOP
0055 011c 18 ce 00 00   HEADER   LDY     #$0
0056 0120 8d 32         BSR      GETBYTE
0057 0122 18 09         DEY
0058 0124 26 f6         BNE      HEADER          * Must be only 1 bit set
0059 0126 b6 01 86      LDA      DATA
0060 0129 81 80         CMPA     #$80
0061 012b 27 04         BEQ      SYNCED
0062 012d 8d 42         BSR      MID
0063 012f 20 eb         BRA      HEADER
0064                    SYNCED
0065 0131 8d 21         BSR      GETBYTE
0066 0133 b6 01 86      LDA      DATA
0067 0136 81 80         CMPA     #$80
0068 0138 27 f7         BEQ      SYNCED
0069
0070 013a 8d 18         INSYNC   BSR     GETBYTE
0071
0072 013c c6 ff         LDAB     #$FF
0073 013e f7 10 04      STAB     PORTB
0074 0141 7f 10 04      CLR      PORTB
0075
0076                    *        LDAA    DATA
0077                    *        JSR     $FFB2
0078                    *        LDAA    DATA
0079                    *        JSR     $FFB5
0080                    *        LDAA    #'_
0081                    *        JSR     $FFB8
0082                    *        LDAA    #'_
0083                    *        JSR     $FFB8
0084
0085 0144 b6 01 86      LDAA     DATA
0086 0147 81 41         CMPA     #'A
0087 0149 2d d1         BLT      HEADER
0088 014b 81 7a         CMPA     #'z
0089 014d 2e cd         BGT      HEADER
0090 014f bd ff b8      JSR      $FFB8
0091
0092 0152 20 e6         BRA      INSYNC
0093
0094                    * ********************
0095
0096                    GETBYTE
0097 0154 3c            PSHX                     * sets DATA to read value
0098 0155 ce 00 08      LDX      #$8             * and Y to number of 1 bits
0099 0158 7f 01 86      CLR      DATA
0100
0101 015b 8d 14         BYTEL    BSR     MID
0102 015d 2e 09         BGT      ITIS0
0103
0104 015f 8d 10         BSR      MID
0105 0161 2e 05         BGT      ITIS0
0106
0107 0163 18 08         ITIS1    INY
0108 0165 0d            SEC
```

APPENDIX A

```
0109 0166 20 01              BRA      GOTBIT
0110
0111 0168 0c         ITISO   CLC
0112
0113 0169 79 01 86   GOTBIT  ROL      DATA
0114
0115 016c 09                 DEX
0116 016d 26 ec              BNE      BYTEL
0117
0118
0119 016f 38                 PULX
0120 0170 39                 RTS
0121
0122                       * .....................
0123
0124
0125 0171 7d 01 85   MID     TST      VALID
0126 0174 26 fb              BNE      MID
0127 0176 7c 01 85           INC      VALID
0128
0129 0179 fc 01 83           LDD      DELTA
0130 017c 1a 83 02 58        CPD      #600
0131 0180 39                 RTS
0132
0133                       * **********************
0134
0135 0181         PEDGE      RMB      2
0136 0183         DELTA      RMB      2
0137 0185         VALID      RMB      1
0138 0186         DATA       RMB      1
0139
0140                       * **********************
0141
0142 0187 fc 10 10   TIC1INT LDD      TIC1
0143 018a b3 01 81           SUBD     PEDGE    * D = PEDGE - This edge
0144 018d fd 01 83           STD      DELTA    * store in DELTA
0145 0190 fc 10 10           LDD      TIC1
0146 0193 fd 01 81           STD      PEDGE
0147 0196 86 04              LDAA     #$04
0148 0198 b7 10 23           STAA     TFLG1    * Clear the interrupt
0149 019b 7f 01 85           CLR      VALID
0150 019e 3b                 RTI
0151
0152
```

APPENDIX A

```
0001                    ******************************
0002                    ****** Tape IF Software for 68HC11 *******
0003                    ******************************
0004                    ****** Copyright Fake Space Labs *********
0005                    ****** 1990 - By I.E.K and N.T.B *********
0006                    ******************************
0007
0008                    * Buffalo definitions
0009
0010 0033               ORG    $33
0011
0012 0033               RMB    20
0013 0047               USTACK RMB    30
0014
0015 1000               REGBS  EQU    $1000
0016 1003               PORTC  EQU    $1003   * Port C is input (Data from HP2020)
0017 1004               PORTB  EQU    $1004   * 0:5 = /OE for HP2020s  6: Hi/Lo byte 7: /Reset
0018 102b               BAUD   EQU    $102B
0019 102c               SCCR1  EQU    $102C
0020 102d               SCCR2  EQU    $102D
0021 102e               SCSR   EQU    $102E
0022 102f               SCDAT  EQU    $102F
0023
0024 100e               TCNT   EQU    $100E   * Timer 16 bits
0025 1018               TOC2   EQU    $1018   * Timer out comp 2
0026 1020               TCTL1  EQU    $1020   * Timer control
0027 1023               TFLG1  EQU    $1023
0028 1022               TMSK1  EQU    $1022
0029
0030
0031                    * Pseud vect for TOC2
0032
0033 00dc               ORG    $00DC
0034
0035 00dc 7e b6 90      PSVECT1 JMP   TOC2INT
0036
0037                    * Ram vars
0038
0039 0100               ORG    $0100
0040
0041 0100               PWIDTH RMB    2
0042 0102               DONE   RMB    1
0043
0044                    * Main program
0045
0046 b600               ORG    $B600
0047
0048                    START
0049 b600 8e 00 47      LDS    #USTACK
0050
0051 b603 86 7e         LDAA   #$7E    * JUMP OPCODE
0052 b605 97 dc         STAA   PSVECT1
0053 b607 ce b6 90      LDX    #TOC2INT
0054 b60a df dd         STX    PSVECT1+1
0055
0056                    INITDON
0057
0058
0059 b60c 86 40         LDAA   #$40
0060 b60e b7 10 20      STAA   TCTL1   * Set TOC2 to toggle mode
0061 b611 b7 10 22      STAA   TMSK1   * Eanble interrupts
0062
0063 b614 7f 01 02      CLR    DONE
0064
0065 b617 cc e0 00      LDD    #$E000
0066 b61a fd 01 00      STD    PWIDTH
0067
0068 b61d fc 10 0e      LDD    TCNT    * read timer
0069 b620 f3 01 00      ADDD   PWIDTH
0070 b623 fd 10 18      STD    TOC2    * store in TOC2
0071
0072 b626 86 ff         LDAA   #$FF
0073 b628 c6 00         LDAB   #$00
0074 b62a f7 10 04      STAB   PORTB
0075
0076 b62d 0e            CLI
0077
0078                    LOOP
0079
0080 b62e 86 80         LDAA   #$80
0081 b630 8d 28         BSR    SENDA
0082 b632 86 80         LDAA   #$80
0083 b634 8d 24         BSR    SENDA
0084 b636 86 80         LDAA   #$80
0085 b638 8d 20         BSR    SENDA
0086 b63a 86 80         LDAA   #$80
0087 b63c 8d 1c         BSR    SENDA
0088 b63e 86 80         LDAA   #$80
0089 b640 8d 18         BSR    SENDA
0090 b642 86 80         LDAA   #$80
0091 b644 8d 14         BSR    SENDA
0092 b646 86 80         LDAA   #$80
0093 b648 8d 10         BSR    SENDA
0094 b64a 86 80         LDAA   #$80
0095 b64c 8d 0c         BSR    SENDA
0096
0097 b64e c6 1a         LDAB   #26
0098 b650 86 41         ALPHA  LDAA   #'A
0099 b652 1b            ABA
0100 b653 8d 05         BSR    SENDA
0101 b655 5a            DECB
0102 b656 26 f8         BNE    ALPHA
0103
0104 b658 20 d4         BRA    LOOP
0105
0106                    * ****************
0107
0108 b65a 18 ce 00 08   SENDA  LDY    #8
```

APPENDIX A

```
0109 b65e 37                PSHB
0110 b65f c6 00             LDAB      #$00
0111 b661 f7 10 04          STAB      PORTB
0112 b664 c6 ff             LDAB      #$FF
0113 b666 f7 10 04          STAB      PORTB
0114 b669 33                PULB
0115
0116 b66a 48       BITLOOP  LSLA
0117 b66b 24 04             BCC       BIT0
0118
0119 b66d 8d 0e    BIT1     BSR       SEND1
0120 b66f 20 02             BRA       DONEBIT
0121
0122 b671 8d 05    BIT0     BSR       SEND0
0123
0124 b673 18 09    DONEBIT  DEY
0125 b675 26 f3             BNE       BITLOOP
0126 b677 39                RTS
0127
0128                        * ....................
0129
0130
0131 b678 ce 03 20  SEND0   LDX       #800
0132 b67b 20 07             BRA       PULSE
0133
0134 b67d ce 01 90  SEND1   LDX       #400
0135 b680 8d 02             BSR       PULSE
0136 b682 20 00             BRA       PULSE
0137
0138 b684 ff 01 00  PULSE   STX       PWIDTH
0139 b687 7c 01 02          INC       DONE
0140 b68a 7d 01 02  WAIT4IT TST       DONE
0141 b68d 26 fb             BNE       WAIT4IT
0142 b68f 39                RTS
0143
0144
0145                        * ********************
0146
0147                        * X has next pulse width and is cleared when used
0148 b690 fc 01 00  TOC2INT LDD       PWIDTH
0149 b693 f3 10 18          ADDD      TOC2      * Add pulse width
0150 b696 fd 10 18          STD       TOC2      * and store in TOC2
0151 b699 86 40             LDAA      #$40
0152 b69b b7 10 23          STAA      TFLG1     * Clear the interrupt
0153 b69e 7f 01 02          CLR       DONE
0154 b6a1 3b                RTI
0155
0156
```

What is claimed is:

1. A method for controlling production of a virtual environment by a virtual reality computer system, including the steps of:
   (a) processing music signals to generate control signals having music and/or control information; and
   (b) operating the virtual reality computer system in response to the control signals to generate said virtual environment.

2. The method of claim 1, wherein step (b) includes the step of:
   producing a graphic display of the virtual environment on a display device of a type coupled to a head of a human user which provides an immersive visual experience of said virtual environment to the user.

3. The method of claim 2, wherein the graphic display is populated with at least one animated virtual object, where at least one characteristic of the virtual object changes in response to at least one of the music signals.

4. The method of claim 2, wherein the graphic display is a stereoscopic representation of a three-dimensional virtual environment.

5. A method for controlling production of a virtual environment by a virtual reality computer system, including the steps of:
   (a) prerecording a control track having audio and/or control information corresponding to an audio signal; and
   (b) operating the virtual reality computer system in response to said prerecorded control track to generate said virtual environment.

6. The method of claim 5, wherein step (b) includes the step of producing a graphic display of the virtual environment on a display device, and also including the steps of:
   (c) supplying the audio signal to the virtual reality computer system; and
   (d) operating the virtual reality computer system in response to both said audio signal and said prerecorded control track to generate said virtual environment.

7. The method of claim 6, wherein step (c) includes the step of supplying the audio signal to the virtual reality computer system with a first delay relative to the prerecorded control track, wherein the first delay is selected to enable generation of sounds in response to the audio signal in a manner so that the sounds have a desired time relationship to the graphic display.

8. The method of claim 5, wherein step (a) includes the step of automatically generating the control track by processing the audio signal.

9. The method of claim 5, wherein step (a) includes the step of manually operating an input device to generate the control track.

10. A method for controlling a computer system, including the steps of:
    (a) prerecording a control track having audio and/or control information corresponding to an audio signal; and
    (b) operating the computer system in response to said prerecorded control track.

11. The method of claim 10, also including the steps of:
    (c) supplying the audio signal to the computer system; and
    (d) operating the computer system in response to both the audio signal and the prerecorded control track.

12. A virtual reality computer system, including:
    means for supplying a first signal selected from a group consisting of a control signal having music and/or control information generated in response to a music signal, a prerecorded control track having music and/or control information corresponding to the music signal, and a control signal having music and/or control information generated in response to the prerecorded control track; and
    means for receiving the first signal and influencing action within a virtual environment in response to said first signal.

13. The apparatus of claim 12, wherein the means for supplying the first signal includes an analysis apparatus having means for receiving said music signal in digital or analog form, and processing said music signal to produce control information for modification of objects in the virtual environment.

14. The apparatus of claim 12, wherein said music signal is delayed in time to compensate for delays in other parts of the virtual reality computer system.

15. The apparatus of claim 12, wherein the means for supplying the first signal includes a music playing means for supplying said music signal.

16. A virtual reality computer system for producing a virtual environment, including:
    means for prerecording a control track having music and/or control information corresponding to a music signal; and
    means for producing the virtual environment in response to said prerecorded control track.

17. The system of claim 16, wherein the means for producing the virtual environment includes:
    a display device; and
    a means for producing a graphic display of the virtual environment on the display device.

18. The system of claim 16, also including:
    means for supplying the music signal to the means for producing the virtual environment, and wherein the means for producing the virtual environment includes means for producing said virtual environment in response to both said music signal and said prerecorded control track.

19. Apparatus as in claim 16, wherein said control track contains additional information to that which can be extracted from the music signal.

20. The system of claim 16, wherein said control track is time shifted relative to the music signal to compensate for delays in said virtual reality computer system.

21. A virtual reality computer system, including:
    a source of a music signal; and
    an apparatus for extracting information from the music signal for modification of objects in a virtual environment.

22. A computer system, including:
    means for prerecording a control track having audio and/or control information corresponding to an audio signal; and
    a processor which receives the control track and which is programmed with software for operating the computer system in response to said control track.

23. The system of claim 22, also including:
    means for supplying the audio signal to the processor, and wherein the processor is programmed with software for operating the computer system in response to both the audio signal and the control track.

* * * * *